United States Patent
Stephens et al.

(10) Patent No.: US 11,269,944 B2
(45) Date of Patent: Mar. 8, 2022

(54) TARGETED GAMING NEWS AND CONTENT FEEDS

(71) Applicant: SONY INTERACTIVE ENTERTAINMENT LLC, San Mateo, CA (US)

(72) Inventors: Mischa Stephens, San Mateo, CA (US); David Lutz, San Mateo, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 147 days.

(21) Appl. No.: 16/359,160

(22) Filed: Mar. 20, 2019

(65) Prior Publication Data

US 2020/0192929 A1 Jun. 18, 2020

Related U.S. Application Data

(63) Continuation-in-part of application No. 16/220,397, filed on Dec. 14, 2018, now Pat. No. 11,080,748.

(51) Int. Cl.
*G06F 16/435* (2019.01)
*H04L 29/06* (2006.01)
(Continued)

(52) U.S. Cl.
CPC .......... *G06F 16/435* (2019.01); *A63F 13/61* (2014.09); *G06F 16/438* (2019.01);
(Continued)

(58) Field of Classification Search
CPC .... G06F 16/9535; G06F 16/73; G06F 16/732; G06F 16/735
See application file for complete search history.

(56) References Cited

U.S. PATENT DOCUMENTS

| 8,448,095 B1 | 5/2013 | Haussila et al. |
| 8,764,555 B2 | 7/2014 | Quan et al. |

(Continued)

FOREIGN PATENT DOCUMENTS

| CN | 113710337 | 11/2021 |
| CN | 113710340 | 11/2021 |

(Continued)

OTHER PUBLICATIONS

U.S. Appl. No. 16/220,465 Office Action dated Jun. 15, 2020.
(Continued)

*Primary Examiner* — William Spieler
(74) *Attorney, Agent, or Firm* — Polsinelli LLP

(57) ABSTRACT

A system and method for targeted gaming news and media feeds is provided. Information about an interaction by a user with an interactive content title and a plurality of interactive content titles may be stored in memory. A processor executes instructions stored in memory, wherein execution of the instructions by the processor analyzes the information stored in memory regarding interaction by a user with an interactive content title and identifies one or more keywords that characterize the user interaction with the interactive content title. Media stored in a database may be filtered based on the identified keywords and displayed within a targeted media feed on a user device of the user. The displayed targeted media may be updated based on new information regarding user interaction with the interactive content title.

23 Claims, 4 Drawing Sheets

(51) Int. Cl.
*H04L 29/08* (2006.01)
*G06F 16/483* (2019.01)
*G06F 16/9535* (2019.01)
*G06F 16/438* (2019.01)
*A63F 13/61* (2014.01)
*H04L 65/60* (2022.01)
*H04L 67/53* (2022.01)

(52) U.S. Cl.
CPC ........ *G06F 16/483* (2019.01); *G06F 16/9535* (2019.01); *H04L 65/601* (2013.01); *H04L 67/20* (2013.01); *A63F 2300/5506* (2013.01)

(56) References Cited

U.S. PATENT DOCUMENTS

| | | | |
|---|---|---|---|
| 9,168,460 B2 | 10/2015 | Pearce | |
| 9,381,425 B1 | 7/2016 | Curtis et al. | |
| 9,795,879 B2 | 10/2017 | Colenbrander | |
| 10,109,003 B1 | 10/2018 | Jenkins et al. | |
| 10,564,820 B1 | 2/2020 | Cabanero et al. | |
| 10,843,085 B2 | 11/2020 | Stephens | |
| 10,881,962 B2 | 1/2021 | Stephens | |
| 11,080,748 B2 | 8/2021 | Stephens | |
| 11,213,748 B2 | 1/2022 | Jarzebinski | |
| 2004/0021684 A1 | 2/2004 | B. Millner | |
| 2008/0262858 A1 | 10/2008 | Broady et al. | |
| 2009/0170609 A1 | 7/2009 | Kang et al. | |
| 2009/0276713 A1* | 11/2009 | Eddy | G06Q 30/00 715/733 |
| 2010/0070613 A1* | 3/2010 | Chen | H04L 67/306 709/219 |
| 2011/0067061 A1 | 3/2011 | Karaoguz et al. | |
| 2011/0113149 A1 | 5/2011 | Kaal | |
| 2011/0314029 A1* | 12/2011 | Fischer | H04L 67/10 707/748 |
| 2011/0319229 A1 | 12/2011 | Corbalis et al. | |
| 2012/0004956 A1 | 1/2012 | Huston et al. | |
| 2012/0094762 A1 | 4/2012 | Khan | |
| 2012/0206574 A1 | 8/2012 | Shikata et al. | |
| 2012/0317198 A1* | 12/2012 | Patton | G06F 16/9537 709/204 |
| 2013/0064527 A1 | 3/2013 | Maharajh et al. | |
| 2013/0086484 A1 | 4/2013 | Antin et al. | |
| 2013/0165234 A1 | 6/2013 | Hall et al. | |
| 2013/0212342 A1 | 8/2013 | McCullough et al. | |
| 2013/0244785 A1 | 9/2013 | Gary | |
| 2014/0012922 A1 | 1/2014 | Wu | |
| 2014/0199045 A1 | 7/2014 | Lee et al. | |
| 2014/0204014 A1 | 7/2014 | Thorn et al. | |
| 2014/0206456 A1 | 7/2014 | Koplar | |
| 2014/0228112 A1 | 8/2014 | Laakkonen et al. | |
| 2014/0243098 A1 | 8/2014 | Yong et al. | |
| 2015/0026728 A1 | 1/2015 | Carter et al. | |
| 2015/0081777 A1 | 3/2015 | Laine et al. | |
| 2015/0142799 A1 | 5/2015 | Eronen et al. | |
| 2015/0224396 A1 | 8/2015 | Okada | |
| 2015/0245084 A1 | 8/2015 | Downing et al. | |
| 2015/0296250 A1 | 10/2015 | Casper | |
| 2015/0331856 A1* | 11/2015 | Choi | G06Q 50/01 707/746 |
| 2015/0381689 A1 | 12/2015 | Ganesh et al. | |
| 2016/0005326 A1 | 1/2016 | Syrmis et al. | |
| 2016/0029153 A1 | 1/2016 | Linn et al. | |
| 2016/0078471 A1 | 3/2016 | Hamedi | |
| 2016/0147890 A1 | 5/2016 | Wissner et al. | |
| 2016/0149956 A1 | 5/2016 | Birnbaum et al. | |
| 2016/0277349 A1* | 9/2016 | Bhatt | G06F 40/40 |
| 2016/0350813 A1* | 12/2016 | Balasubramanian | G06Q 30/0269 |
| 2017/0050111 A1 | 2/2017 | Perry et al. | |
| 2017/0087460 A1 | 3/2017 | Perry | |
| 2017/0126757 A1 | 5/2017 | Kuo et al. | |
| 2017/0188116 A1 | 6/2017 | Major et al. | |
| 2017/0301041 A1* | 10/2017 | Schneider | G06Q 50/01 |
| 2017/0339093 A1* | 11/2017 | Pesavento | G06F 16/9535 |
| 2017/0354888 A1 | 12/2017 | Benedetto et al. | |
| 2018/0001216 A1 | 1/2018 | Bruzzo et al. | |
| 2018/0014077 A1 | 1/2018 | Hou et al. | |
| 2018/0021684 A1 | 1/2018 | Benedetto | |
| 2018/0033250 A1* | 2/2018 | O'Heeron | A63F 13/30 |
| 2018/0101614 A1* | 4/2018 | Kuipers | G06N 20/00 |
| 2018/0126279 A1 | 5/2018 | Stelovsky et al. | |
| 2018/0192142 A1 | 7/2018 | Paul | |
| 2018/0318708 A1 | 11/2018 | Rom et al. | |
| 2018/0343505 A1 | 11/2018 | Loheide et al. | |
| 2018/0359477 A1 | 12/2018 | Yang | |
| 2019/0208242 A1 | 7/2019 | Bates et al. | |
| 2019/0246149 A1* | 8/2019 | Reza | H04N 21/858 |
| 2019/0282906 A1 | 9/2019 | Yong | |
| 2019/0297376 A1 | 9/2019 | McCarty et al. | |
| 2020/0114267 A1 | 4/2020 | Sakurai | |
| 2020/0147489 A1* | 5/2020 | Mahlmeister | A63F 13/5378 |
| 2020/0184041 A1 | 6/2020 | Andon et al. | |
| 2020/0188781 A1 | 6/2020 | Stephens | |
| 2020/0188792 A1 | 6/2020 | Stephens | |
| 2020/0188794 A1 | 6/2020 | Stephens | |
| 2020/0188796 A1 | 6/2020 | Stephens | |
| 2020/0188800 A1 | 6/2020 | Stephens | |
| 2020/0193476 A1 | 6/2020 | Stephens | |
| 2020/0193477 A1 | 6/2020 | Stephens | |
| 2021/0077907 A1 | 3/2021 | Stephens | |
| 2021/0129023 A1 | 5/2021 | Jarzebinski | |
| 2021/0370169 A1 | 12/2021 | Clingman | |
| 2021/0370185 A1 | 12/2021 | Clingman | |
| 2021/0374180 A1 | 12/2021 | Clingman | |

FOREIGN PATENT DOCUMENTS

| | | |
|---|---|---|
| CN | 113727764 | 11/2021 |
| CN | 113727765 | 11/2021 |
| KR | 2018-0094833 | 8/2018 |
| WO | WO 2009/094611 | 7/2009 |
| WO | WO 2014/047490 | 3/2014 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |
| WO | WO 2021/242476 | 12/2021 |
| WO | WO 2021/242477 | 12/2021 |
| WO | WO 2021/242478 | 12/2021 |

OTHER PUBLICATIONS

U.S. Appl. No. 16/358,546 Office Action dated May 20, 2020.
PCT Application No. PCT/US2019/062626 International Search Report and Written Opinion dated Jan. 29, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
U.S. Appl. No. 16/220,460 Office Action dated Jan. 28, 2020.
PCT Application No. PCT/US2019/062602 International Search Report and Written Opinion dated Feb. 14, 2020.
U.S. Appl. No. 16/380,760 Office Action dated Mar. 6, 2020.
PCT Application No. PCT/US2020/054603 International Search Report and Written Opinion dated Jan. 28, 2021.
U.S. Appl. No. 16/220,465 Final Office Action dated Dec. 24, 2020.
U.S. Appl. No. 16/358,546 Final Office Action dated Jan. 27, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/679,795 Office Action dated May 10, 2021.
U.S. Appl. No. 16/220,397 Office Action dated Sep. 25, 2020.
U.S. Appl. No. 16/220,443 Office Action dated Oct. 19, 2020.
U.S. Appl. No. 16/379,683 Office Action dated Nov. 6, 2020.
Li et al., "Distributed Multimedia Systems", IEEE, Jul. 1997, retrieved on [Feb. 7, 2021], Retrieved from the internet <URL:https://citeseerx.ist.psu.edu/viewdoc/download?doi=10.1.1.128.9759&rep1&type=pdf>.

(56) References Cited

OTHER PUBLICATIONS

PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.
U.S. Appl. No. 16/358,546 Final Office Action dated Nov. 1, 2021.

* cited by examiner

TARGETED GAMING NEWS AND CONTENT FEEDS

CROSS-REFERENCE TO RELATED APPLICATION

This application is a continuation-in-part of U.S. patent application Ser. No. 16/220,397 filed Dec. 14, 2018, which is incorporated by reference herein in its entirety.

BACKGROUND

1. Field of the Invention

The present technology pertains to providing gaming news. More specifically, the present technology may provide for targeted gaming news and content feeds.

2. Description of the Related Art

Gaming news and other game-related content are an increasingly popular and growing information source for game players. Through such content feeds, gaming news from a publisher or gaming content from peers may incentivize further gameplay, promote new features of a game or a new game, or provide gameplay help to their readers. Presently available gaming news and/or content are typically available to a user on a webpage (e.g., portal, home screen, etc.) of a platform. A user typically must navigate to and sort through the news and/or content to find news and/or content relevant to the user.

Due to the popularity of gaming and the sheer number of available game titles, irrelevant gaming news and/or content may frustrate a user. Such irrelevant news may, for example, detract from the user experience when news and/or content do not provide user information to a user and causes a user to expense time interacting (e.g., watching, reading, listening) with irrelevant news and/or content. Further, such news and/or content may frustrate and/or dis-incentivize a user from gameplay.

There is, therefore, a need in the art for systems and methods for targeting gaming news and content feeds.

SUMMARY OF THE PRESENTLY CLAIMED INVENTION

Embodiments of the present invention include systems and methods for providing targeted gaming news and content feeds. Information about an interaction by a user with an interactive content title and a plurality of interactive content titles may be stored in memory. Such information may be analyzed to identify one or more keywords that characterize the user interaction with the interactive content title. Media stored in a database may be filtered based on the identified keywords and displayed within a targeted media feed on a user device of the user. The displayed targeted media may be updated based on new information regarding user interaction with the interactive content title.

Various embodiments may include methods for providing targeted gaming news and content feeds. Such methods may include analyzing received information regarding interaction by a user with an interactive content title. Such methods may include identifying one or more keywords that characterize the user interaction with the interactive content title. Such methods may include filtering media stored in a database based on the identified keywords. Such methods may include displaying the filtered media within a targeted media feed on a user device of the user. Such methods may include updating the display of the targeted media feed based on new information regarding user interaction with the interactive content title.

Additional embodiments may include systems for providing targeted gaming news and content feeds. Such systems may include memory that stores information regarding interaction by a user with an interactive content title. Such systems may include a processor that executes instructions stored in memory. Execution of the instructions by the processor may analyze the information stored in memory regarding interaction by a user with an interactive content title. Execution of the instructions by the processor may identify one or more keywords that characterize the user interaction with the interactive content title. Execution of the instructions by the processor may filter media stored in a database based on the identified keywords. Execution of the instructions by the processor may display the filtered media within a targeted media feed on a user device of the user. Execution of the instructions by the processor may update the display of the targeted media feed based on new information regarding user interaction with the interactive content title.

Further embodiments include non-transitory computer-readable storage media having embodied thereon a program executable by a processor to provide a targeted media feed based on interaction with content.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for providing targeted gaming news and content feeds based on user interaction with content. User information may be stored in a user device or a platform server. Such user information may include data about a user's interaction with one or more interactive content titles. Such user information may be retrieved by the platform server. Media may be stored in a database. Such media may be retrieved by the platform server based on the user information. Such media may be displayed as targeted media on the user device. Such targeted media may be updated by the platform server based on new user information.

Figure 1:
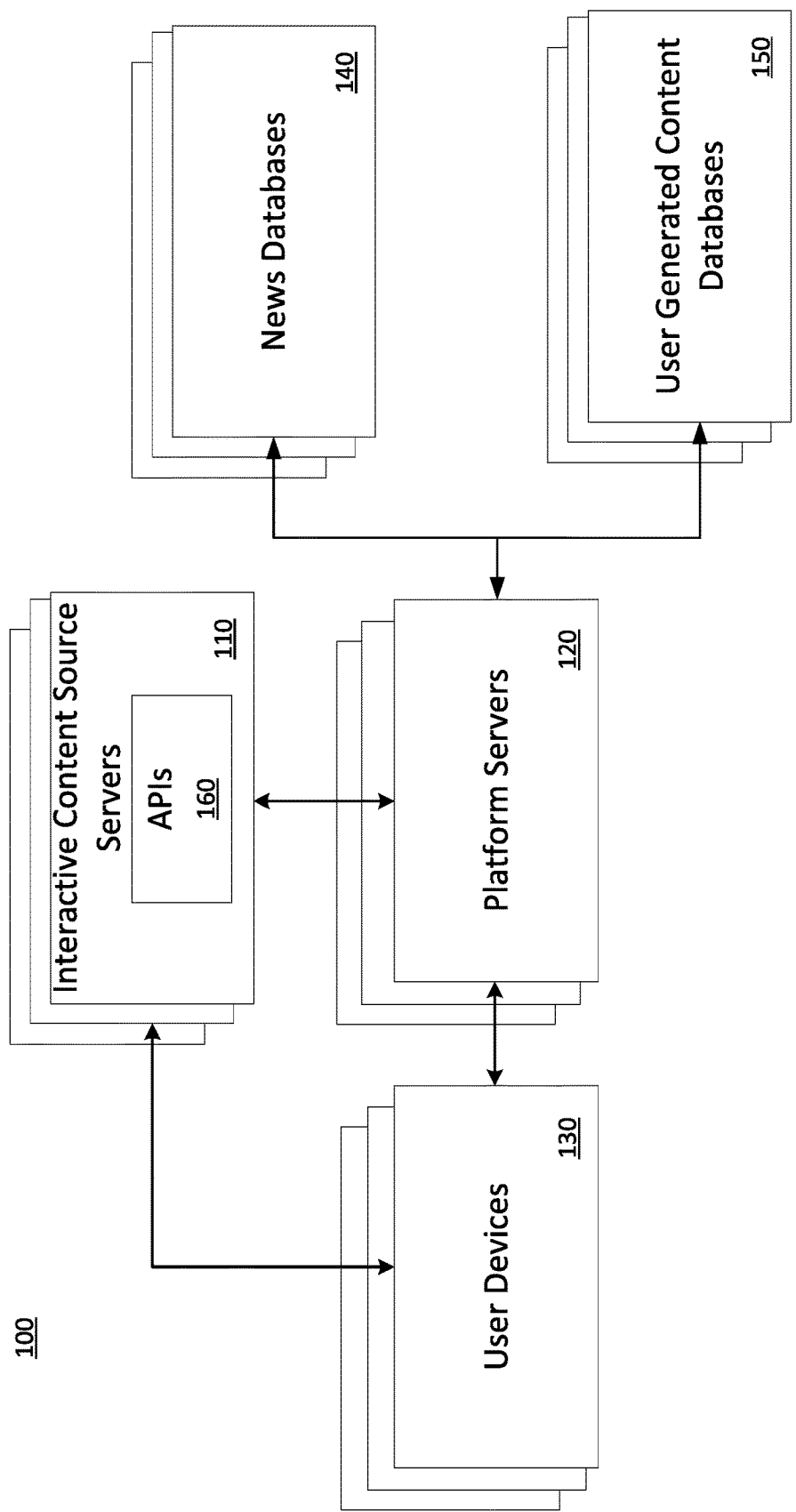
FIG. 1 illustrates an exemplary network environment in which a system for providing targeted gaming news and content feeds may be implemented.

FIG. 1 illustrates an exemplary network environment 100 in which a system for providing targeted gaming news and content feeds can occur. The network environment 100 may include one or more interactive content source servers 110 that provide interactive content titles (e.g., video games, interactive video, etc.), platform servers 120, one or more user devices 130, one or more news database 140, and one or more user-generated content (UGC) databases 150.

Interactive content source servers 110 may maintain and host interactive content titles available for play to a user device 130 over a communication network. Such interactive content servers 110 may be implemented in the cloud (e.g., one or more cloud servers). Each interactive content title may include one or more activities available within the content title. Each of the one or more activities may include an activity ID. The one or more activities may be playable by a single user or by multiple users. Data about a user interaction with an activity may be tracked and stored by the platform servers 120 and/or the user device 130, as will be discussed in detail with respect to FIG. 2. Each interactive content title and/or each respective activity may be stored on any server, a cloud server, any console 228, or any user device 130.

The platform servers 120 may be responsible for communicating with the different interactive content source servers 110, the news databases 140, and the UGC databases 150. Such platform servers 120 may be implemented on one or more cloud servers. The interactive content source servers 110 may communicate with multiple platform servers 120. The platform servers 120 may also carry out instructions, for example, for receiving user information having data about a user's interaction with one or more interactive content titles (e.g., user skill level, user progress with an interactive content title, user progress with an activity of an interaction content title, etc.). The platform servers 120 may further carry out instructions, for example, for retrieving media (e.g., news, UGC, articles, videos, podcasts, etc.) stored in a database based on the user information. The platform servers 120 may further carry out instructions, for example, for displaying the media on a user device of the user as a targeted media. The platform servers 120 may further carry out instructions, for example, for updating the targeted media based on new user information.

The interactive content titles and their corresponding activities may be provided through an application programming interface (API) 160, which allows various types of interactive content source servers 110 to communicate with different platform servers 120 and different user devices 130. API 160 may be specific to the particular computer programming language, operating system, protocols, etc., of the interactive content source servers 110 providing the interactive content titles, the platform servers 120 providing the associated templates, and user devices 130 receiving the same. In a network environment 100 that includes multiple different types of interactive content source servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The news database 140 and the UGC database 150 may be stored on the platform server 120, the interactive content server 110, any of the servers 218 (shown in FIG. 2), on the same server, on different servers, on a single server, or across different servers. Such news database 140 may store media from publishers of interactive content titles and/or third party publishers. Such media—which may pertain to one or more specified interactive content titles—may include metadata (e.g., characterizing the media or the related interactive content title(s)) by which to search for and filter such media. Such media concerning an interactive content title may include, for example, reviews, critiques, criticism, walkthroughs, or tips of interactive content titles. In some instances, such media may be filtered and prevented from being shown to a user by a publisher of the interactive content title. Such filtering may be desirable to prevent media that is unfavorable to the title from being presented to a user.

The UGC database 150 may store UGC (e.g., screen shots, videos, commentary, mashups, etc.) created by users or players of an interactive content title. Such UGC may include metadata by which to filter and search for such media. Such UGC may also include information about the interactive content title and/or the respective creator. Such information may be derived from data gathered during interaction or participation in an activity of an interactive content title. Such information may be bound to the UGC and stored in conjunction with the UGC. Such binding enhances UGC, as the bound information may allow the UGC to deep-link (e.g., directly launch) to an interactive content title, to provide information about an activity and/or a creator of the UGC, and/or to allow a user to interact with the UGC.

Figure 2:
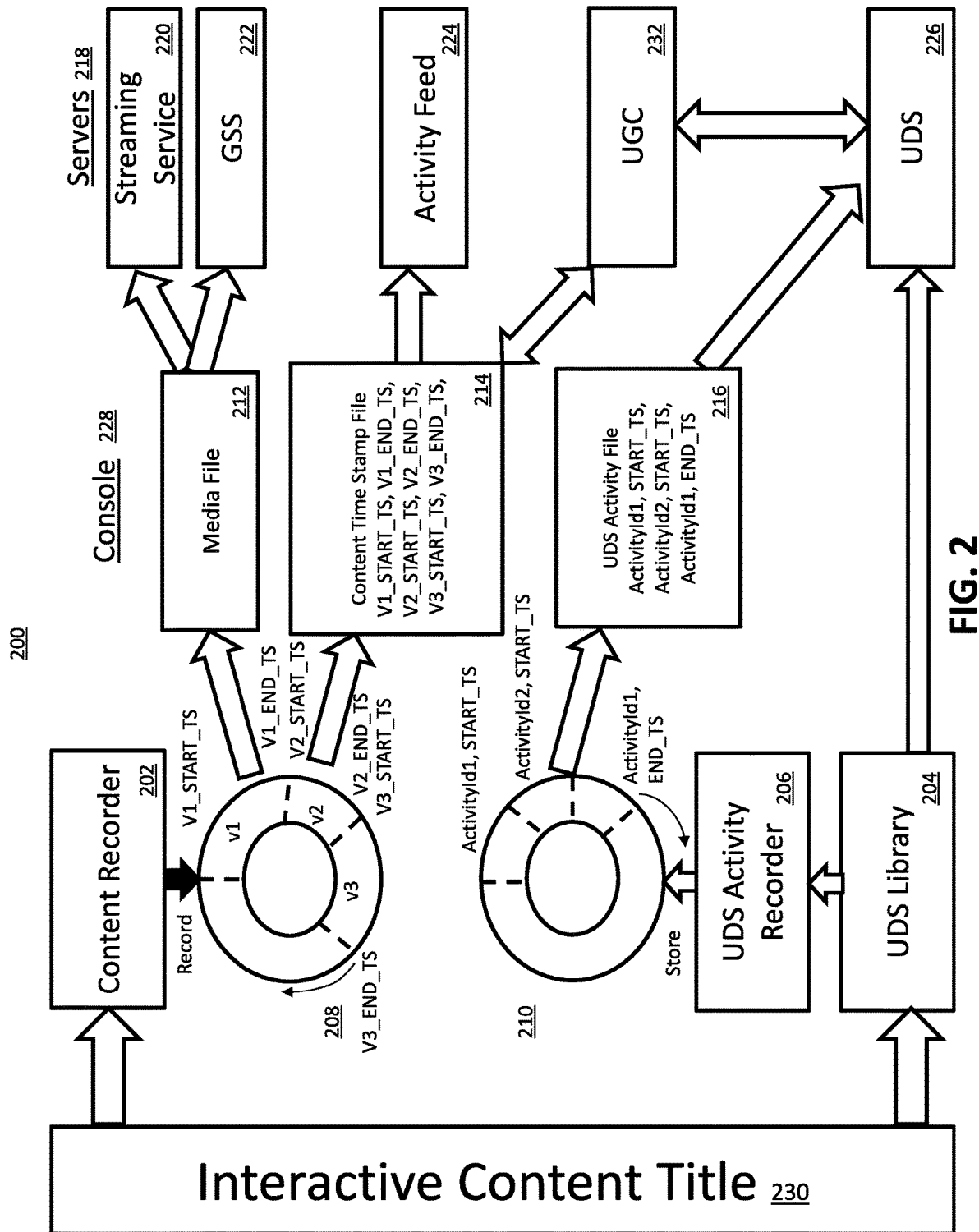
FIG. 2 illustrates a detailed exemplary network in which a system for binding data from a universal data system to user-generated content may be implemented.

In the exemplary network environment 200 of FIG. 2, an exemplary console 228 (e.g., a user device 130) and exemplary servers 218 (e.g., streaming server 220, Ghost Solution Suite Server (GSS Server) 222, activity feed server 224, UGC server 232, and Universal Data Systems (UDS) server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 and/or the GSS Server 222 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID or GSS ID, which matches a streaming ID or GSS ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, a UDS library 204 receives data from the interactive content title 230, and a UDS activity recorder 206 tracks the data to determine when an activity beings and ends. The UDS library 204 and the UDS activity recorder 206 may be implemented on the platform server 120, a cloud server, or on any of the servers 218. When the UDS activity recorder 206 detects an activity beginning, the UDS activity recorder 206 receives activity data (e.g., user interaction with the activity, activity ID, activity start times, activity end times, activity results, activity types, etc.) from the UDS library 204 and records the activity data onto a UDS ring-buffer 210 (e.g., ActivityID1, START_TS; ActivityID2, START_TS; ActivityID3, START_TS). Such activity data recorded onto the UDS ring-buffer 210 may be stored in a UDS activity file 216. Such UDS activity file 216 may also include activity start times, activity end times, an activity ID, activity results, activity types (e.g., competitive match, quest, task, etc.), user or peer data related to the activity. For example, a UDS activity file 216 may store data regarding an item used during the activity. Such UDS activity file 216 may be stored on the UDS server 226, though the UDS activity file 216 may be stored on any server, a cloud server, any console 228, or any user device 130.

Such UDS activity data (e.g., the UDS activity file 216) may be associated with the content data (e.g., the media file 212 and/or the content time stamp file 214). In one example, the UGC server 232 stores and associates the content time stamp file 214 with the UDS activity file 216 based on a match between the streaming ID or GSS ID of the content time stamp file 214 and a corresponding activity ID of the UDS activity file 216. In another example, the UDS server 226 may store the UDS activity file 216 and may receive a search request from the UGC server 232 for a UDS activity file 216. Such search request may be executed by searching for an activity ID of a UDS activity file 216 that matches a streaming ID or GSS ID of a content time stamp file 214 transmitted with the search request. In yet another example, a search request of stored content time stamp files 214 may be executed by matching a start time and end time of a content time stamp file 214 with a start time and end time of a corresponding UDS activity file 216 transmitted with the search request. Such UDS activity file 216 may also be associated with the matched content time stamp file 214 by the UGC server 232, though the association may be performed by any server, a cloud server, any console 228, or any user device 130. In another example, a UDS activity file 216 and a content time stamp file 214 may be associated by the console 228 during creation of each file 216, 214.

Figure 3:
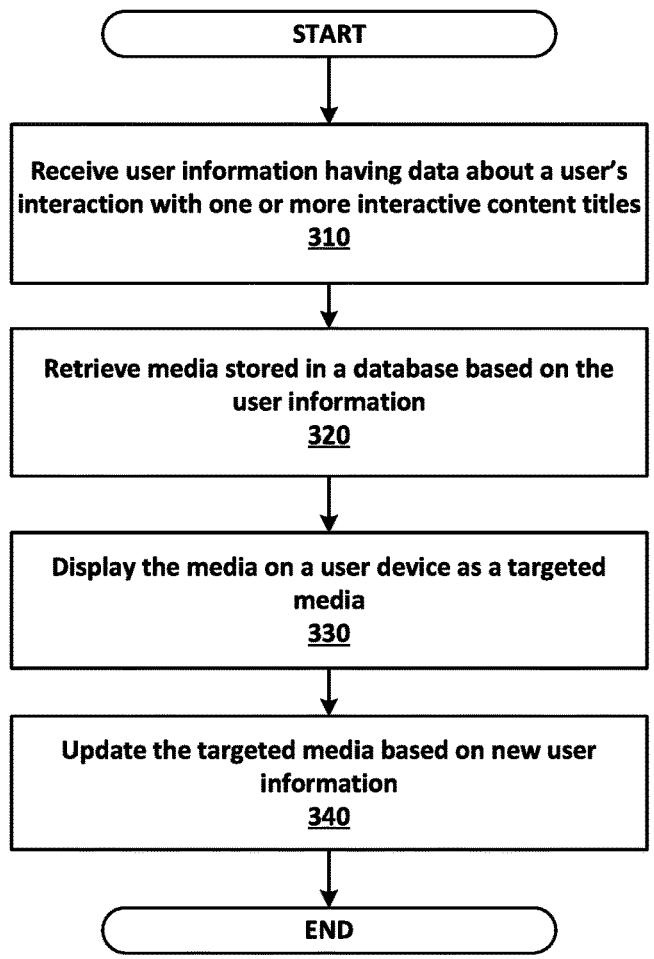
FIG. 3 is a flowchart illustrating an exemplary method for providing targeted gaming news and content feeds.

FIG. 3 is a flowchart illustrating an exemplary method 300 for providing targeted gaming news and content feeds. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, user information is received by the platform server 120 from the user device 130, though such user information may be received by any server, a cloud server, any console 228, or any user device 130. Such user information includes data about a user's interaction with one or more interactive content titles. Such user information may include a UDS activity file 216 which may include information about an activity (e.g., activity ID, interactive content title 230 information, start time, end time, type of activity, result of activity, items or weapons used in the activity) and/or information about the user's interaction with the activity (e.g., user progress within a game, user's skill level, character information). Such user information may be stored on any server, a cloud server, any console 228, or any user device 130.

In step 320, media stored in the news database 140 or the UGC database 150 is retrieved by the platform server 120, though the media may be retrieved by any server, a cloud server, any console 228, or any user device 130. Each stored media may include an associated media file 212 and a corresponding content time stamp file 214. Such retrieval is based on the user information. Such retrieval may include generating keywords based on the user information. For example, a user may be new to an interactive content title, and keywords such as "beginner" or "new" may be generated to characterize the user interaction vis-à-vis the interactive content title 230. Other keywords may characterize the user based the user information indicating the types of activities selected within the interactive content title, progress within such activities, skill level, selected characters, selected weapons or other in-game objects, game-related communications, and other actions taken in relation to one or more interactive content titles. Retrieved media may include both a media file 212 and a content time stamp file 214 associated with a corresponding UDS activity file 216 having an activity ID. Such retrieved media may be assigned the activity ID, thereby associating the retrieved media with the UDS activity file 216.

Such keywords may then be used to filter and search metadata of the stored media. In other words, such keywords may be used to initially filter the store media by filtering out stored media containing metadata that does not contain the keywords. For example, the keywords "beginner" or "new" may generate media (e.g., articles or UGC) having beginner-level background information on the interactive content title or may generate articles with a how-to guide (e.g., manual or walkthrough) for beginners. In another example, the user information indicates that the user is half way through an activity and has a high skill level. Media retrieved may be geared towards advanced users and may include, for example, articles pertaining to advanced techniques and gameplay. Further, in the same example, media retrieved may be targeted to media regarding special events (e.g., events, items, etc.) at the half way point of the activity.

As previously described, such media may be news concerning an interactive content title. Such news and interactive content title may both be produced by a publisher. Such news may be produced by a third party different from the publisher of the interactive content title. As such, a publisher may elect to filter news or media produced by third parties. For example, a publisher may wish to prevent negative news or media about the publisher's interactive content title from reaching the user. Such publisher may also wish to promote positive news or media by well-respected third parties.

Such media may also be UGC produced by one or more peers. Such UGC may include activity data (e.g., an UDS activity file 216) bound to the UGC (e.g., a media file 212 and a content time stamp file 214), as previously described. Such bound activity data may provide an interactive experience with UGC for a user, as described in more detail below. One of the peers may be an influence. UGC from such influencer may be promoted before other media (e.g., another peers media, third party media, or publisher media). Such influencer may incentivize a user to begin or increase interactions with a certain interactive content title.

In step 330, the retrieved media is displayed on the user device 130 as a targeted media. Such targeted media is relevant to a user's experience and point of interaction with an interactive content title, thereby increasing the user experience. Such targeted media may also incentivize the user to continue interaction with the interactive content title by providing helpful tips or exclusive UGC to the user. Further, for UGC media, such UGC may deep link to an interactive content title of the UGC such that the link automatically launches the interactive content title. Such UGC may be provided when a user interacts with the platform server 120, but has not yet begun interacting with an interactive content title. Such UGC may be suggested based on similar activities or interactive content titles that the user has participated in.

In step 340, the targeted media is updated based on new user information. The new user information can be a new UDS activity file 216 having a new activity ID and new information about user interaction with a new activity. Such new user information may include updated progress in an interactive content title, new user skills, and/or increased user experience, etc. Such new user information may also include a new interactive title that the user has begun interactive with. Such targeted media may be updated to include media relevant to the user at these new stages of interaction. For example, as a user progresses through an interactive content title, the relevant media may adjust from beginner level media to advanced level media.

Such systems and methods for providing targeted media increase a user's experience with gameplay and media. By providing targeted media, a user does not have to search for relevant media or spend time interacting with irrelevant media. Further, such targeted media may incentivize users to continue gameplay at points of difficulty where a user may likely end gameplay by providing media with helpful tips to overcome such points of difficulty. Such targeted media may also incentive a user to try a new game by suggesting a new game based on similar games played by the user.

Figure 4:
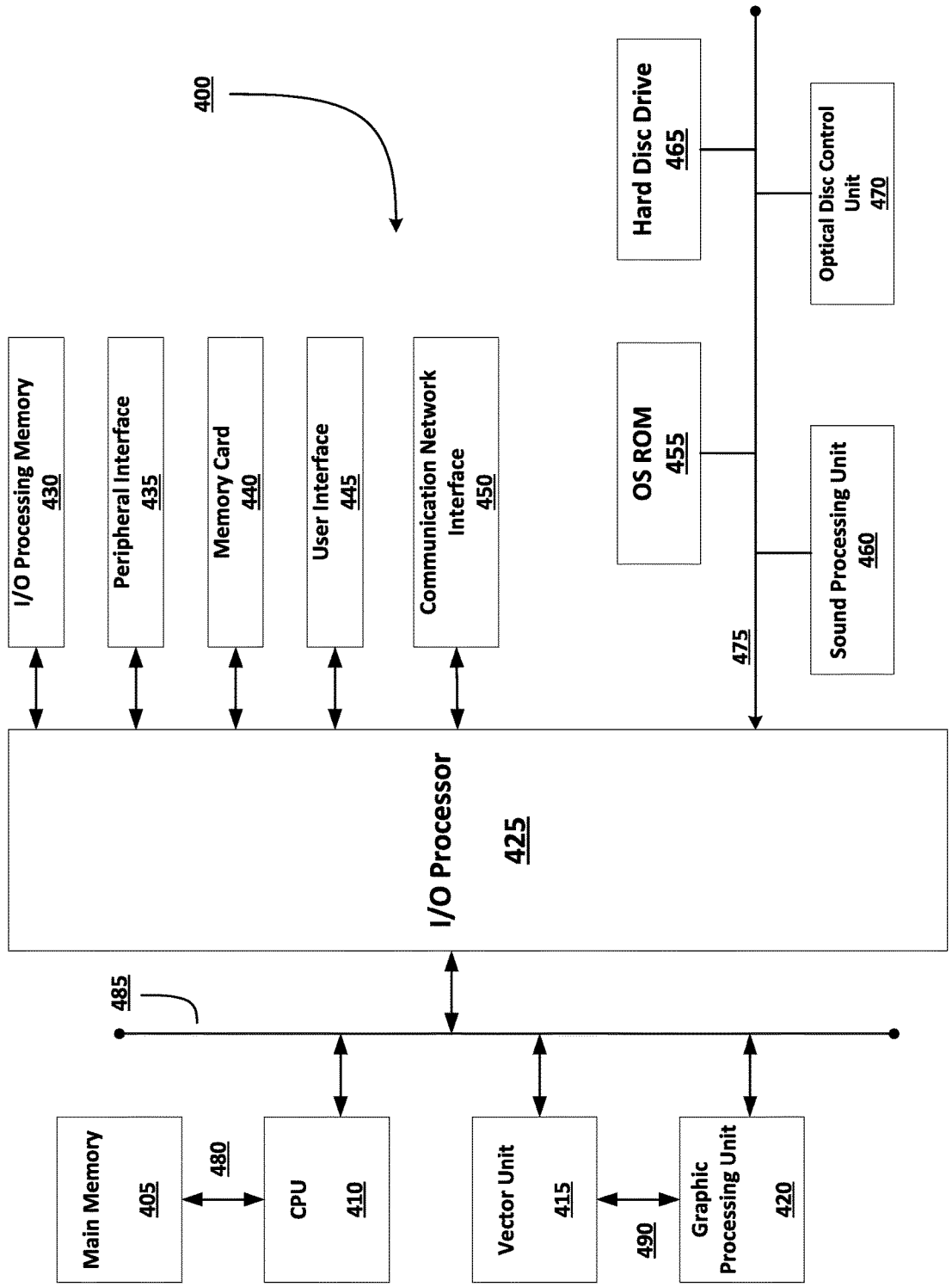
FIG. 4 is an exemplary electronic entertainment system that may be used in providing targeted gaming news and content feeds.

FIG. 4 is an exemplary user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing a targeted media feed based on content interaction, the method comprising:
   receiving information regarding an interactive content title, the received information indicating a set of user interactions by a user with the interactive content title in a plurality of gameplay sessions, wherein each gameplay session of the plurality of gameplay sessions includes a plurality of activities;
   tracking the received information, including the set of user interactions, to determine when each activity of the plurality of activities begins and ends in each gameplay session;
   recording a plurality of media files based on when each activity begins and ends, wherein each recorded media file is associated with respective timestamp data and is stored among the plurality of media files at a database;
   creating respective activity data concurrent with recordation of each media file, wherein the respective activity data is based on a respective user interaction and a respective media file and the respective timestamp data;
   identifying one or more keywords based on the respective activity data;
   filtering a second plurality of media files associated with other users based on the identified keywords, wherein filtering the plurality of media files includes comparing the identified keywords to metadata associated with each of the media files;
   generating a display of a filtered set of media files within the targeted media feed on a user device of the user, each of the media files in the filtered set associated with metadata that matches one or more of the identified keywords; and
   updating the display of the targeted media feed to include a new filtered set of the media files based on one or more new matches corresponding to new interaction by the user with the interactive content title.

2. The method of claim 1, wherein the interactive content title is a game title.

3. The method of claim 2, wherein the received information indicates a current level of progress of the user and a current skill level within the game title.

4. The method of claim 3, further comprising generating the keywords based on the current level of the user progress and the current skill level, wherein filtering the media files comprises matching the keywords to associated metadata of the media files.

5. The method of claim 1, wherein the plurality of media files includes news concerning the interactive content title, and wherein the news is published by a same publisher of the interactive content title.

6. The method of claim 1, wherein the plurality of media files includes user-generated content produced by one or more peers.

7. The method of claim 6, wherein at least one of the one or more peers is a designated influencer.

8. The method of claim 7, further comprising promoting media produced by the designated influencer more than other media within the targeted media feed.

9. The method of claim 6, wherein the user-generated content is specific to the interactive content title and includes a link selectable to automatically launch a specific interactive content title.

10. The method of claim 1, wherein the plurality of media files is produced by one or more third party publishers.

11. The method of claim 10, further comprising filtering a third party media file by publisher.

12. A system for providing a targeted media feed based on content interaction, the system comprising:
    a communication interface that receives information regarding an interactive content title, the received information indicating a set of user interactions by a user with the interactive content title in a plurality of gameplay sessions, wherein each gameplay session of the plurality of gameplay sessions includes a plurality of activities; and
    one or more processors that executes instructions stored in memory, wherein execution of the instructions by the one or more processors:
       tracks the received information, including the set of user interactions, to determine when each activity of the plurality of activities begins and ends in each gameplay session;
       records a plurality of media files based on when each activity begins and ends, wherein each recorded media file is associated with respective timestamp data and is stored among the plurality of media files at one or more databases;
       creates respective activity data concurrent with recordation of each media file, wherein the respective activity data is based on a respective user interaction and the respective media file and the respective timestamp data;
       identifies one or more keywords based on each respective activity data;
       filters a second plurality of media files stored in the one or more databases based on the identified keywords, the second plurality of media files associated with other users, wherein filtering the plurality of media files includes comparing the identified keywords to metadata associated with each of the media files;
       generates a display of a filtered set of the media files within the targeted media feed on a user device of the user, each of the media files in the filtered set associated with metadata that matches one or more of the identified keywords; and updates the display of the targeted media feed to include a new filtered set of the media files based on one or more new information regarding user matches corresponding to new interaction by the user with the interactive content title.

13. The system of claim 12, wherein the interactive content title is a game title.

14. The system of claim 13, wherein the received information regarding the respective user interaction by the user indicates a current level of user progress and a current skill level within the game title.

15. The system of claim 14, wherein further execution of the instructions by the one or more processors generates the keywords based on the current user progress level and the current skill level, and wherein the filtering the plurality of media files comprises matching the keywords to metadata of the plurality of media files.

16. The system of claim 12, wherein the plurality of media files includes news concerning the interactive content title, and wherein the news is published by a same publisher of the interactive content title.

17. The system of claim 12, wherein the plurality of media files includes user-generated content produced by one or more peers.

18. The system of claim 17, wherein at least one of the one or more peers is a designated influencer.

19. The system of claim 18, wherein further execution of the instructions by the one or more processors promotes media produced by the designated influencer more than other media within the targeted media feed.

20. The system of claim 17, wherein the user-generated content is specific to the interactive content title and includes a link selectable to automatically launch a specific interactive content title.

21. The system of claim 12, wherein the plurality of media files is produced by one or more third party publishers.

22. The system of claim 21, wherein further execution of the instructions by the one or more processors filters a third party media by publisher.

23. A non-transitory computer-readable medium having embodied thereon a program executable by one or more processors to perform a method for providing provide a targeted media feed based on content interaction, the method comprising:

receiving information regarding an interactive content title, the received information indicating a set of user interactions by a user with the interactive content title in a of gameplay sessions, wherein each gameplay session of the plurality of gameplay sessions includes a plurality of activities;

tracking the received information, including the set of user interactions, to determine when each activity of the plurality of activities begins and ends in each gameplay session;

recording a plurality of media files based on when each activity begins and ends, wherein each recorded media file is associated with respective timestamp data and is stored among the plurality of media files at a database;

creating respective activity data concurrent with recordation of each media file, wherein the respective activity data is based on a respective user interaction and a respective media file and the respective timestamp data;

identifying one or more keywords based on the respective activity data;

filtering a second plurality of media files associated with other users based on the identified keywords, wherein filtering the plurality of media files includes comparing the identified keywords to metadata associated with each of the media files;

generating a display of a filtered set of media files within the targeted media feed on a user device of the user, each of the media files in the filtered set associated with metadata that matches one or more of the identified keywords; and updating the display of the targeted media feed to include a new filtered set of the media files based on one or more new matches corresponding to new interaction by the user with the interactive content title.

* * * * *